United States Patent [19]

Nishio et al.

[11] Patent Number: 5,404,240
[45] Date of Patent: Apr. 4, 1995

[54] OPTICAL SWITCHING SYSTEM FOR OPTICAL WAVELENGTH-DIVISION AND TIME-DIVISION MULTIPLEXED SIGNALS

[75] Inventors: Makoto Nishio; Takahiro Numai, both of Tokyo, Japan

[73] Assignee: NEC Corporation, Tokyo, Japan

[21] Appl. No.: 835,304

[22] Filed: Feb. 14, 1992

[30] Foreign Application Priority Data

Feb. 14, 1991 [JP] Japan .................................. 3-043020
Feb. 15, 1991 [JP] Japan .................................. 3-044432

[51] Int. Cl.[6] .................................................. H04J 4/00
[52] U.S. Cl. ................................... 359/123; 359/138; 359/139; 359/127
[58] Field of Search ............... 359/117, 123, 124, 125, 359/127, 128, 135, 136, 137, 139, 138

[56] References Cited

U.S. PATENT DOCUMENTS

| | | | |
|---|---|---|---|
| 5,005,166 | 4/1991 | Suzuki et al. | 359/117 |
| 5,111,323 | 5/1992 | Tanaka et al. | 359/117 |
| 5,121,381 | 6/1992 | Takahashi et al. | 359/124 |
| 5,189,542 | 2/1993 | Oudar | 359/128 |
| 5,194,977 | 3/1993 | Nishio | 359/128 |

FOREIGN PATENT DOCUMENTS

| | | | |
|---|---|---|---|
| 0030092 | 2/1988 | Japan | 359/128 |
| 0050194 | 3/1988 | Japan | 359/123 |

OTHER PUBLICATIONS

Conference Record, IEEE Global Telecommunications Conference, 28 Nov.–1 Dec. 1988, vol. 2, pp. 933–937, Hollywood US; XP40531, S. Suzuki et al., "Photonic Wavelength-Division and Time-Division Hybrid Switching Networks for Large Line-Capacity Broadband Switching Systesm", p. 934, right column, line1-9-p. 935, left column, Line 9; FIG. 3.

Applied Physics Letters, vol. 52, No. 9, 29 Feb. 1988, New York, US, pp. 329–331, K. Kasahara et al., "Double Heterostructure Optoelectronic switch as Dynamic Memory with Low-power Comsumption".

SE87-146 of Switching Engineering Conference of Electronics and Information Communication, entitled "A Study on Wavelength-Division and Time-Division Composite Optical Communication Networks", 1987.

Electronics Letters, No. 20, vol. 28, pp. 1088–1089, Sep. 24, 1987.

Electronics Letters, No. 20, vol. 28, pp. 1088–1089, Sep. 24, 1987.

Springer Series in Electronics and Photonics, "Photonics II", 1990, vol. 29, Springer Verlag Berlin De, pp. 358–361, Two-Dimensional Photonics Switching Network Using Wavelength Optics.

Proceedings of the Fourth Tirrenia International Workshop on Digital Communications, 19–23 Sep. 1989, pp. 333–348, Tirrenia It, XP164006, Sakaguchi et al, "Photonic Switching Capacity Extension Schemes".

Conference Record, IEEE International Conference on Communications, 15–19 Apr. 1990, vol. 3, pp. 1125–1129, Atlanta US, XP145999, Suzuki et al, "Wavelength Technology in Photonic Switching Systems".

*Primary Examiner*—Richard E. Chilcot, Jr.
*Assistant Examiner*—R. Bacares
*Attorney, Agent, or Firm*—Sughrue, Mion, Zinn, Macpeak & Seas

[57] ABSTRACT

An optical switching system for optical wavelength-division and time-division multiplexed signals includes a plurality of tunable wavelength filters each of which selects a signal having a desired wavelength from an optical wavelength-division and time-division multiplexed signal, a plurality of optical memory elements each of which is supplied with an output signal of each of the plurality of tunable wavelength filters. Each optical memory element memorizes a light intensity of the output signal by being applied with a first control voltage and supplies an output port with the output signal which is converted to have a predetermined wavelength in a desired time slot. The tunable wavelength filters and optical memory elements may by replaced by wavelength filters and tunable wavelength optical memories.

3 Claims, 15 Drawing Sheets

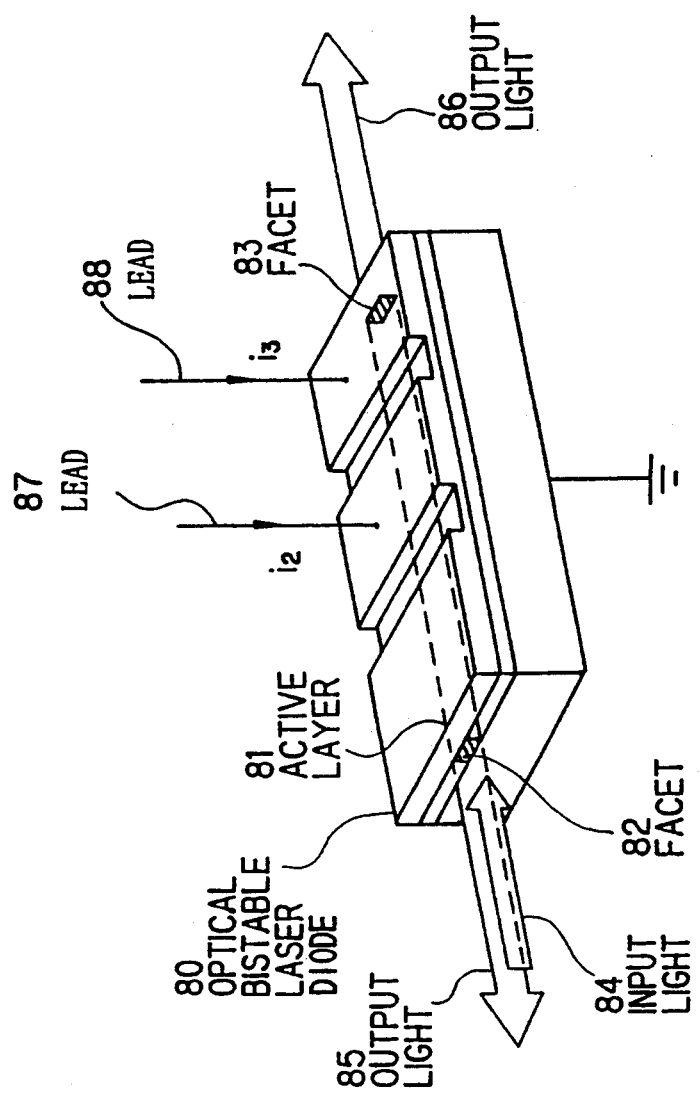

OPTICAL SWITCHING SYSTEM FOR OPTICAL WAVELENGTH-DIVISION AND TIME-DIVISION MULTIPLEXED SIGNALS

FIELD OF THE INVENTION

This invention relates to an optical switching system for optical wavelength-division and time-division multiplexed signals, and more particularly to an optical switching system for optical wavelength-division and time division multiplexed signals in which input and output optical signals are directly exchanged with each other without being converted to electrical signals.

BACKGROUND OF THE INVENTION

An optical communication system using an optical fiber as a transmission line has advantages such as in transmission ability of mass information due to a broadband characteristic of the optical fiber and low induced noise transmission. Therefore, such an optical communication system will be used widely in various fields. In such an optical communication system, an optical switching system for optical wavelength-division and time-division multiplexed signals is used in which an input optical signal having a specific wavelength in a specific time slot is converted to an output optical signal having a different wavelength in a different time slot. It is preferable to exchange signals without converting to electric signals in the switching system.

A first conventional optical switching system has been disclosed by Suzuki et al. on pages 91 to 96 of the text SE87-146 of Switching Engineering Conference of Electronics and Information Communication, entitled "A Study on Wavelength-Division and Time-Division Composite Optical Communication Networks", 1987. In the first conventional optical switching system, optical wavelength-division and time-division multiplexed signals are exchanged by converting wavelengths and time slots of the input optical signals.

The first conventional optical switching system includes an optical splitter which divides an input optical signal to a plurality of optical signals, a plurality of tunable wavelength filters each of which selects one optical signal having a desired wavelength and a time slot, a plurality of optical bistable elements each of which converts a wavelength of each corresponding optical signal to a predetermined wavelength, and an optical switch which selectively supplies a selected signal from the converted signals supplied from the corresponding optical bistable element. The optical bistable element can hold the output intensity $P_{out}$ for a desired period by controlling conditions of the input intensity $P_{in}$ and the injected current i. Such an optical bistable element has been disclosed on pages 1088 and 1089 of Electronics Letters, No. 20, Vol. 23, Sep. 24, 1987. Additionally, the optical switch includes a plurality of optical gate switches.

In operation, the optical splitter supplies the tunable wavelength filters with divided input signals which are optical wavelength-division and time-division multiplexed signals. One of the tunable wavelength filters selects a signal having a desired wavelength from the optical wavelength-division and time-division multiplexed signals. The optical bistable elements are supplied with the current i which decreases to be reset periodically. If a signal having a specific wavelength allocated in a specific time slot is supplied to one of the optical bistable elements, the optical bistable element keeps supplying the optical switch with an output signal corresponding to the signal supplied thereto but converted to have a different predetermined wavelength for a period until the current i decreases. The optical switch supplies an optical output port with the output signal supplied from the optical bistable element in a desired time slot. Therefore, the input signal is exchanged to be an output signal having a different wavelength in a different time slot.

A second conventional optical switching system has been disclosed by Suzuki et al. in the text No. 29-2 of IEEE Global Communications & Exhibition, entitled "Photonic Wavelength-Division and Time-Division Hybrid Switching Networks for Large Line-Capacity Broadband Switching systems", 1988.

The second conventional optical switching system includes a wavelength filter which selects one optical signal having a predetermined wavelength from an input signal which is an optical wavelength-division and time-division multiplexed signal, an optical switch which selectively supplies a plurality of signals each of which is allocated in a different time slot, a plurality of tunable wavelength output optical bistable elements each of which converts a wavelength of each corresponding optical signal to a desired wavelength and keeps supplying the converted signal for a period, and an optical switch, each of which selectively supplies a plurality of signals each of which is allocated in a different time slot in turn. Structures of the optical bistable elements and the optical switch in the second conventional optical switching system are the same as those of the optical bistable elements and the optical switch in the first conventional optical switching system.

In operation, the wavelength filter selects a signal having a predetermined wavelength from the optical wavelength-division and time-division multiplexed signals. The tunable wavelength output optical bistable elements are supplied with the current i which decreases periodically to be reset. If a signal having a specific wavelength allocated in a specific time slot is supplied to one of the optical bistable elements, the optical bistable element keeps supplying the optical switch with an output signal corresponding to the signal supplied thereto but converted to have a different desired wavelength for a period until the current i decreases. The optical switch supplies the output signal supplied from the optical bistable element in a desired time slot. Therefore, the input signal is exchanged to be an output signal having a different wavelength in a different time slot.

According to the conventional optical switching systems for optical wavelength-division and time-division multiplexed signals, however, there is a disadvantage in that many active elements such as optical bistable elements are required to compose the system as wavelength-division multiplexity and time-division multiplexity numbers become larger. The reason will be explained.

Each of the optical bistable elements keeps supplying an output signal until the current i decreases, so that the optical switch for reading out optical signals is required to include optical gate switches corresponding to each optical bistable element in order to supply the output signals in turn to an optical combiner. Generally, if wavelength-division multiplexity and time-division multiplexity numbers are m and n, respectively, required number of the tunable wavelength filters, the optical bistable elements and the optical gate switches is m×n, respectively, so that required number of active elements is 3×m×n.

Further, there is another disadvantage in that the line-capacity is relatively small, because the conventional optical switching system includes only one input port and one output port, so that the line-capacity is limited by the wavelength-division multiplexity and time-division multiplexity numbers.

SUMMARY OF THE INVENTION

Accordingly, it is an object of the invention to provide an optical switching systems for optical wavelength-division and time-division multiplexed signals in which the number of active elements composing the system is reduced.

It is another object of the invention to provide an optical switching system for optical wavelength-division and time-division multiplexed signals in which the line-capacity increases without being limited by the wavelength-division multiplexity and time-division multiplexity numbers of the signals.

According to a feature of the invention, an optical switching system for optical wavelength-division and time-division multiplexed signals comprises:

a plurality (n) of tunable wavelength filters each of which selects a signal having a desired wavelength from an optical wavelength-division and time-division multiplexed signal in every time-slot; and a plurality (n) of optical memory elements each of which is supplied with an output signal of each of the plurality (n) of tunable wavelength filters, each of the plurality (n) of optical memory elements memorizing a light intensity of the output signal by being applied with a first control voltage and supplying an output port with the output signal which is converted to have a predetermined wavelength in a desired time slot.

BRIEF DESCRIPTION OF THE DRAWINGS

The invention will be explained in more detail in conjunction with appended drawings wherein:

FIG. 2 is perspective view illustrating an optical bistable element included in the first conventional optical switching system for optical wavelength-division and time-division multiplexed signals shown in FIG. 1;

DESCRIPTION OF THE PREFERRED EMBODIMENTS

Before describing an optical switching system for optical wavelength-division and time-division multiplexed signals in preferred embodiments according to the invention, the conventional optical switching systems for optical wavelength-division and time-division multiplexed signals described before will be explained in conjunction with FIGS. 1 to 7.

Figure 1:
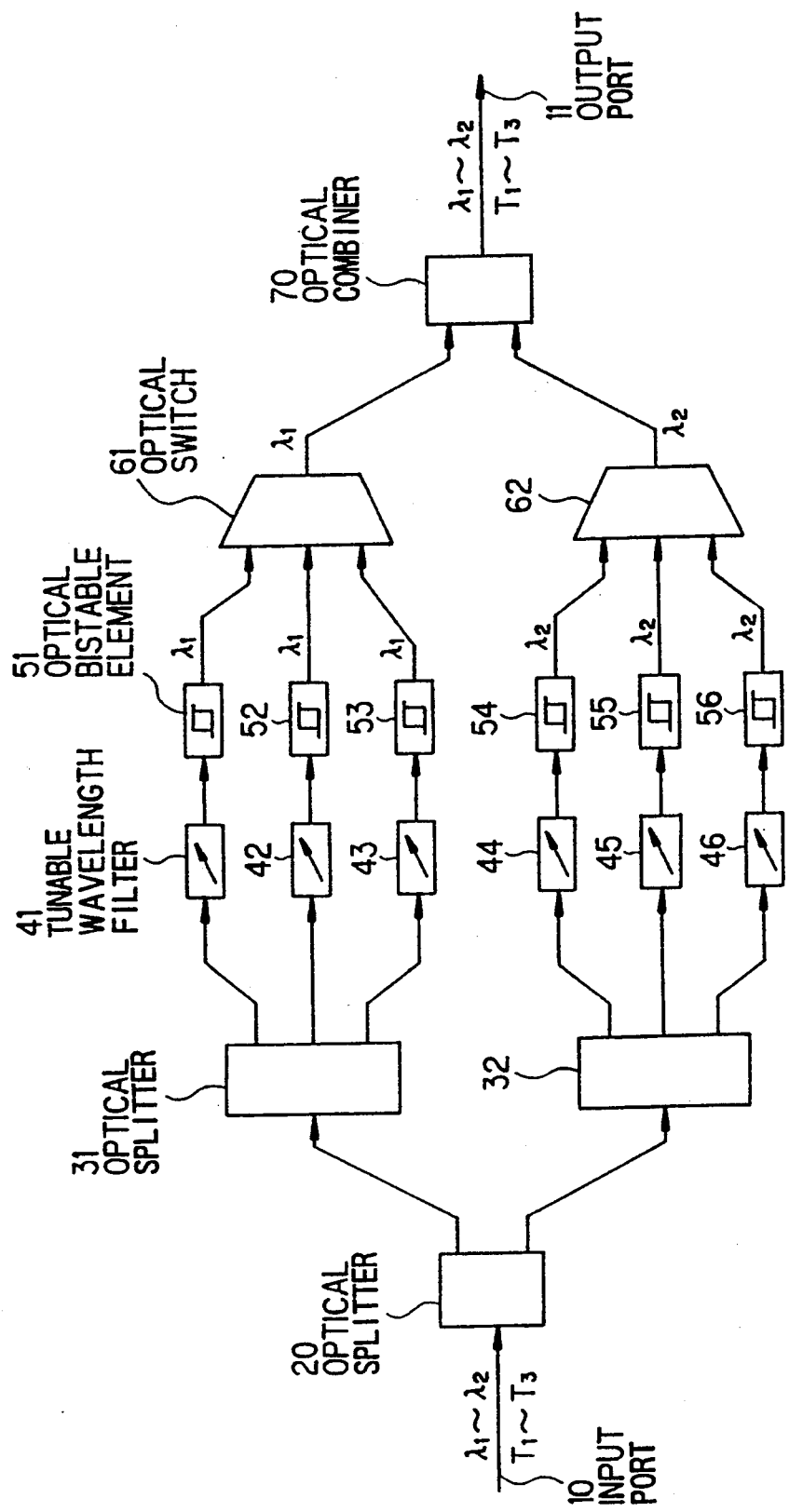
FIG. 1 is a block diagram of a first conventional optical switching system for optical wavelength-division and time-division multiplexed signals.

FIG. 1 shows the first conventional optical switching system which exchanges input and output optical signals which are divided to two wavelengths of $\lambda_1$ and $\lambda_2$ and divided to three time slots of $T_1$ to $T_3$. The optical switching system includes an optical splitter 20 which divides an input optical signal to two optical signals, two optical splitters 31 and 32 each divides a divided optical signal supplied from the optical splitter 20 to three optical signals, six tunable wavelength filters 41 to 46 each selecting one optical signal having a specific wavelength and a time slot, six optical bistable elements 51 to 56 each converting a wavelength of each corresponding optical signal to $\lambda_1$ in the elements 51 to 53 and $\lambda_2$ in the elements 54 to 56 and maintains to supply the converted signal, two optical switches 61 and 62 each selectively supplying a selected signal from the converted signals supplied by the corresponding optical bistable element, and an optical combiner 70 which combines the selected signals supplied from the optical switches 61 and 62.

FIG. 2 shows a structure of the optical bistable elements 51 to 56. The optical bistable element includes an optical bistable laser diode 80 including an active layer 81 indicated by dot lines. An input light 84 is supplied through a facet 82 of the active layer 81 and irradiated from the facet 82 and the opposite facet 83 as output lights 85 and 86, respectively. The optical bistable element is injected with a current i which is a sum of $i_2$ and $i_3$ which are supplied to the optical bistable laser diode 80 through leads 87 and 88, respectively. The wavelength of output lights 85 and 86 can be changed to a desired wavelength by changing a ratio of $i_2$ to $i_3$ while the whole current i is maintained to be constant. The wavelength thereof becomes shorter when the ratio $i_2/i_3$ becomes large, while the wavelength becomes longer when the ratio $i_2/i_3$ becomes small.

Figure 3A:
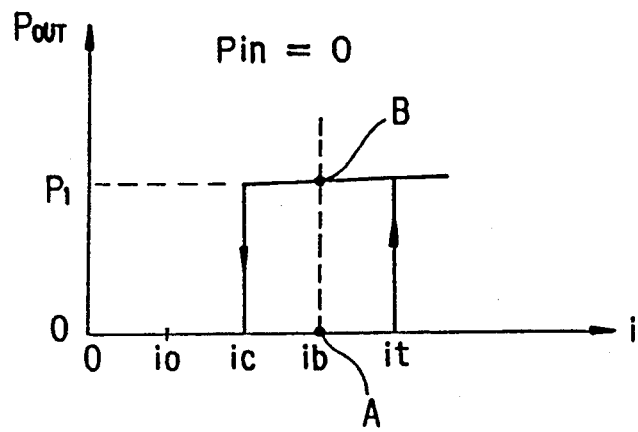
FIGS. 3A to 3C are graphs explaining operation of the optical bistable element shown in FIG. 2.

FIG. 3A shows an output intensity $P_{out}$ correlated with an injected current i on a condition that an input intensity $P_{in}$ of the input light is zero. In the optical bistable element, an output characteristic shows a hysteresis loop. In more detail, an optical intensity $P_{out}$ of the output light remains almost zero as the injected current i increases from zero until $i_c$, however, the optical intensity $P_{out}$ increases abruptly to $P_1$ when the injected current i becomes $i_t$. The optical intensity $P_{out}$ remains $P_1$ as the injected current i decreases to $i_c$. However, at an injected current of $i_c$, intensity $P_{out}$ decreases abruptly to zero. Consequently, the optical bistable element has two stable points, A and B, reset and set states, respectively, at an injected current of $i_b$.

Figure 3B:
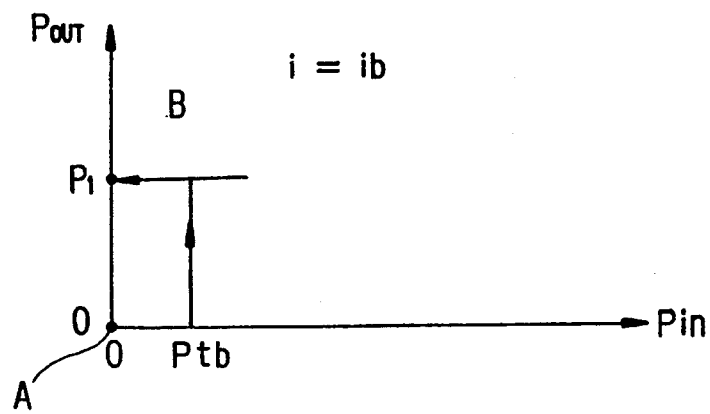

FIG. 3B shows the output intensity $P_{out}$ correlated with an input intensity $P_{in}$ of the input light on a condition that the injected current i is fixed at $i_b$. The optical intensity $P_{out}$ remains zero as the input intensity $P_{in}$ increases from zero when the optical bistable element is at the reset state A, however, the optical intensity $P_{out}$ increases abruptly to $P_1$ when the input intensity $P_{in}$ becomes $P_{tb}$. The optical intensity $P_{out}$ remains $P_1$ as the input intensity $P_{in}$ decreases. and the optical intensity $P_{out}$ remains $P_1$ even if the input intensity $P_{in}$ becomes zero when the optical bistable element is at the set state B. Consequently, the optical bistable element which is initially at the reset state A switches to the set state B where the output intensity $P_{out}$ is $P_1$ by supplying the input intensity $P_{in}$ in larger than $P_{tb}$, and the output intensity $P_{out}$ is maintained to $P_1$ even after stopping of the supply of the input intensity $P_{in}$.

Figure 3C:
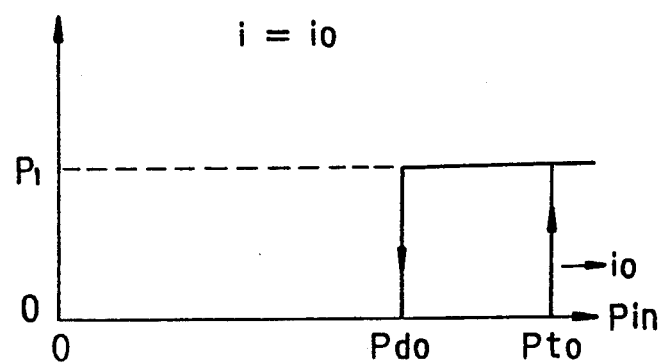

FIG. 3C shows the output intensity $P_{out}$ correlated with the input intensity $P_{in}$ on a condition that the injected current i is fixed to $i_0$ smaller than $i_c$. The optical intensity $P_{out}$ remains zero as the input intensity $P_{in}$ increases from zero until $P_{t0}$, however, the optical intensity $P_{out}$ increases abruptly to $P_1$ when the input intensity $P_{in}$ in becomes $P_{t0}$. The optical intensity $P_{out}$ remains $P_1$ as the input intensity $P_{in}$ decreases until $P_{d0}$, however, the optical intensity $P_{out}$ decreases abruptly to zero when the input intensity $P_{in}$ becomes $P_{d0}$. Therefore, it is possible to change the states of the optical bistable element from the set state B where the injected current i is $i_b$ to the reset state A by changing the input intensity $P_{in}$ to zero and the injected current i to under $i_c$.

As explained above, the optical bistable element can hold the output intensity $P_{out}$ for a desired period by controlling conditions of the input intensity $P_{in}$ and the injected current i.

Figure 4:
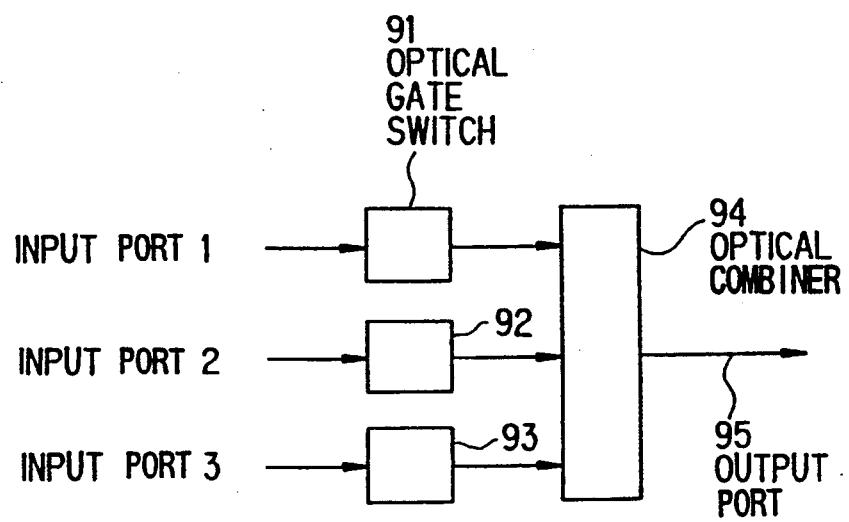
FIG. 4 is a block diagram of an optical switch included in the first conventional optical switching system for optical wavelength-division and time-division multiplexed signals shown in FIG. 1.

FIG. 4 shows a structure of the optical switches 61 and 62. The optical switch includes three optical gate switches 91 to 93 and an optical combiner 94. The optical gate switches 91 to 93 supply the optical combiner 94 with input signals which are supplied respectively from input ports 1 to 3 in accordance with a control signal supplied thereto.

Figure 5:
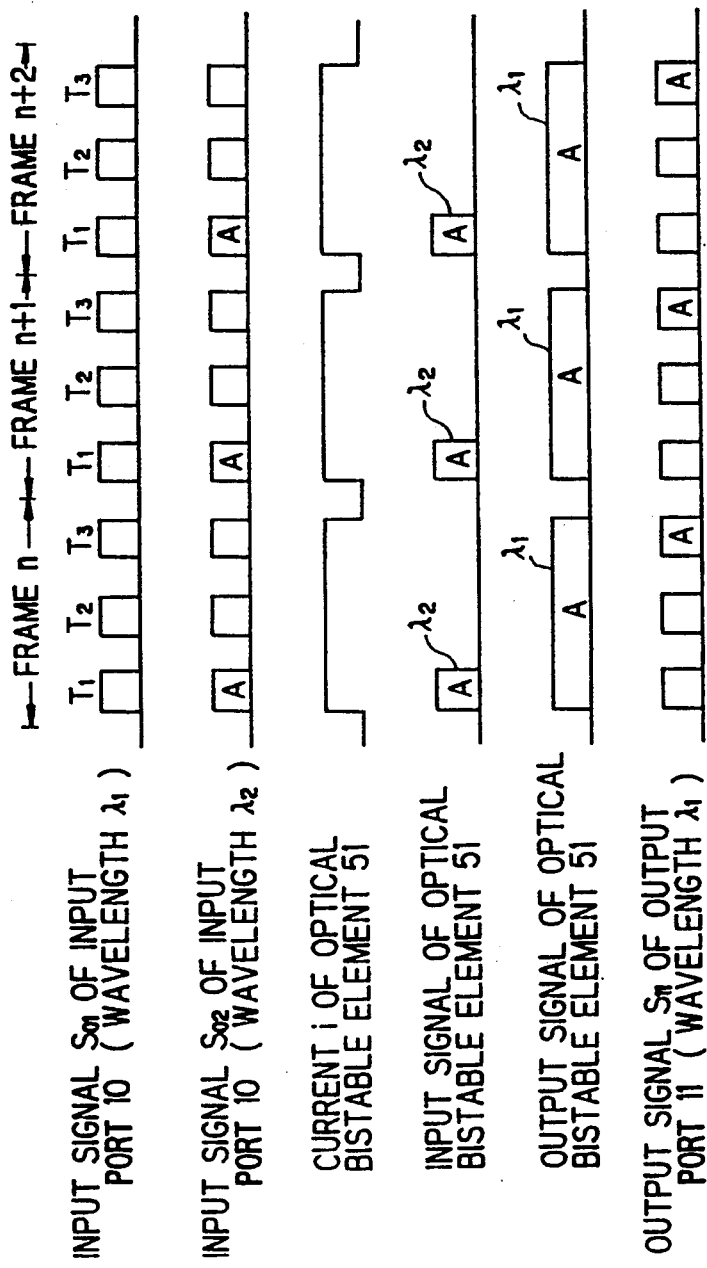
FIG. 5 is a timing chart for explaining operation of the first conventional optical switching system for optical wavelength-division and time-division multiplexed signals.

Next, operation of the optical switching system will be explained in conjunction with FIG. 5. It is supposed that input signals $S_{01}$ to $S_{03}$ of wavelengths $\lambda_1$ to $\lambda_3$ allocated respectively into time slots $T_1$ to $T_3$ are supplied to an input port 10, and the input signal A of a wavelength $\lambda_2$ in a time slot $T_1$ is to to be exchanged to be supplied to an output port 11 as an output signal $S_{11}$ of a wavelength $\lambda_1$ in a time slot $T_3$. The tunable wavelength filter 41 is supplied with the input signals $S_{01}$ of wavelength $\lambda_1$ and $S_{02}$ of wavelength $\lambda_2$. On the other hand, the optical bistable element 51 is supplied with the current i which decreases periodically as shown in FIG. 5, so that the optical bistable element 51 becomes at the reset state periodically. If the input signal A of wavelength $\lambda_2$ in a time slot $T_1$ is supplied to the optical bistable element 51, the optical bistable element 51 keeps supplying an output signal of wavelength $\lambda_2$ corresponding to the input signal A to the optical switch 61 for the period until the current i decreases. The optical switch 61 supplies the output signal of wavelength $\lambda_1$ in the time slot $T_3$ to the optical combiner 70, so that an output signal $S_{11}$ including a signal of wavelength $\lambda_1$ in the time slot $T_3$ is supplied from the output port 11.

Figure 6:
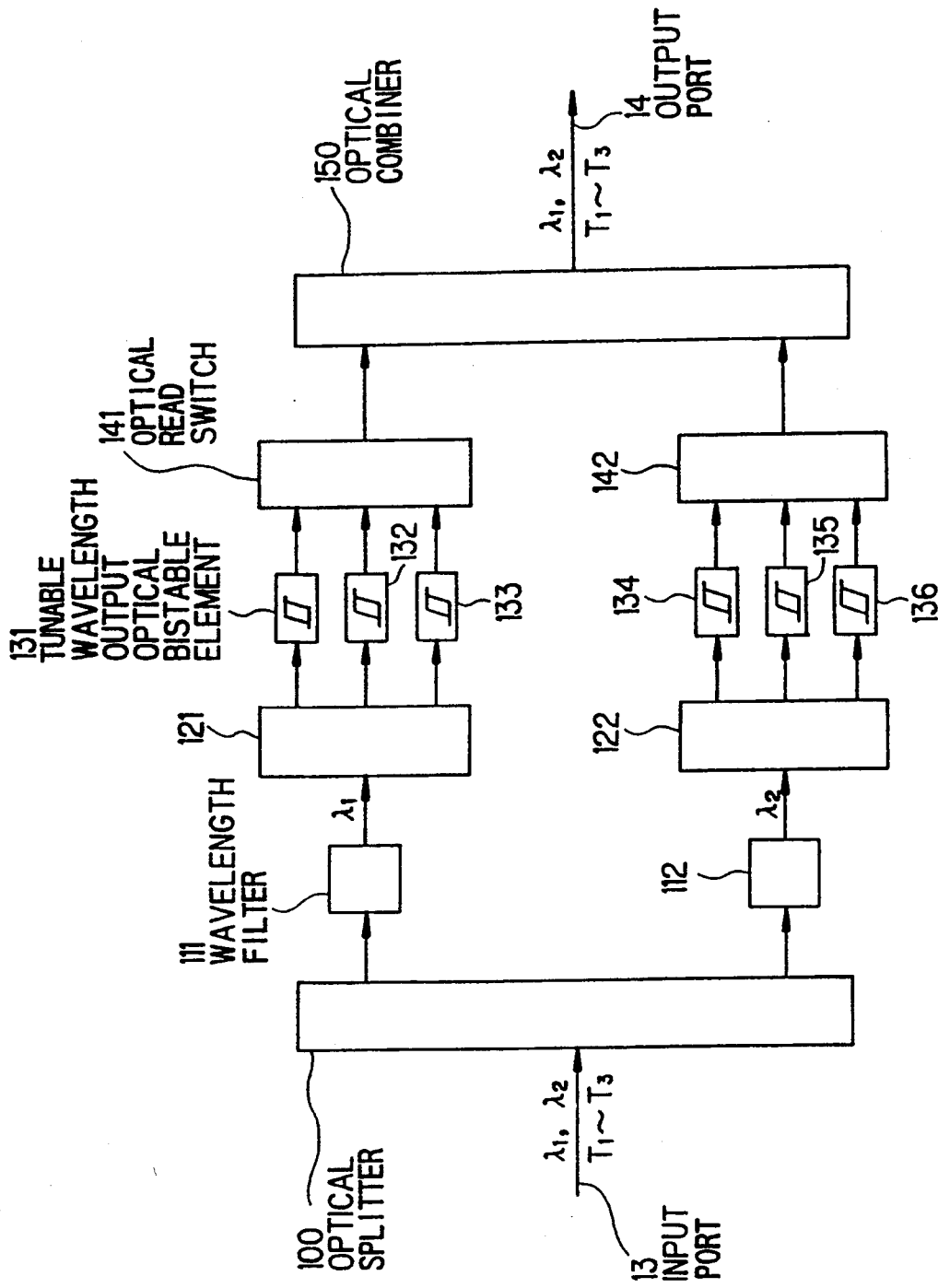
FIG. 6 is a block diagram of a second conventional optical switching system for optical wavelength-division and time-division multiplexed signals.

FIG. 6 shows the second conventional optical switching system which exchanges input and output optical signals which are divided to two wavelengths of $\lambda_1$ and $\lambda_2$ and divided to three time slots of $T_1$ to $T_3$. The optical switching system includes an optical splitter 100 which divides an input optical signal to two optical signals, two wavelength filters 111 and 112 each selects one optical signal having a specific wavelength, two optical write switches 121 and 122 each selectively supplies three signals in time slots $T_1$ to $T_3$, six tunable wavelength output optical bistable elements 131 to 136 each converts a wavelength of each corresponding optical signal to $\lambda_1$ in the elements 131 to 133 and $\lambda_2$ in the elements 134 to 136 and maintains to supply the converted signal, two optical read switches 141 and 142 each selectively supplies a selected signal from the converted signals supplied from the corresponding tunable wavelength output optical bistable element, and an optical combiner 150 which combines the selected signals supplied from the optical switches 141 and 142. A structure of the optical bistable elements 131 to 136 is the same as shown in FIG. 2, and operation thereof is the same as explained before in the explanation of the first conventional optical switching system. A structure of the optical read switches 141 and 142 is the same as shown in FIG. 4.

Figure 7:
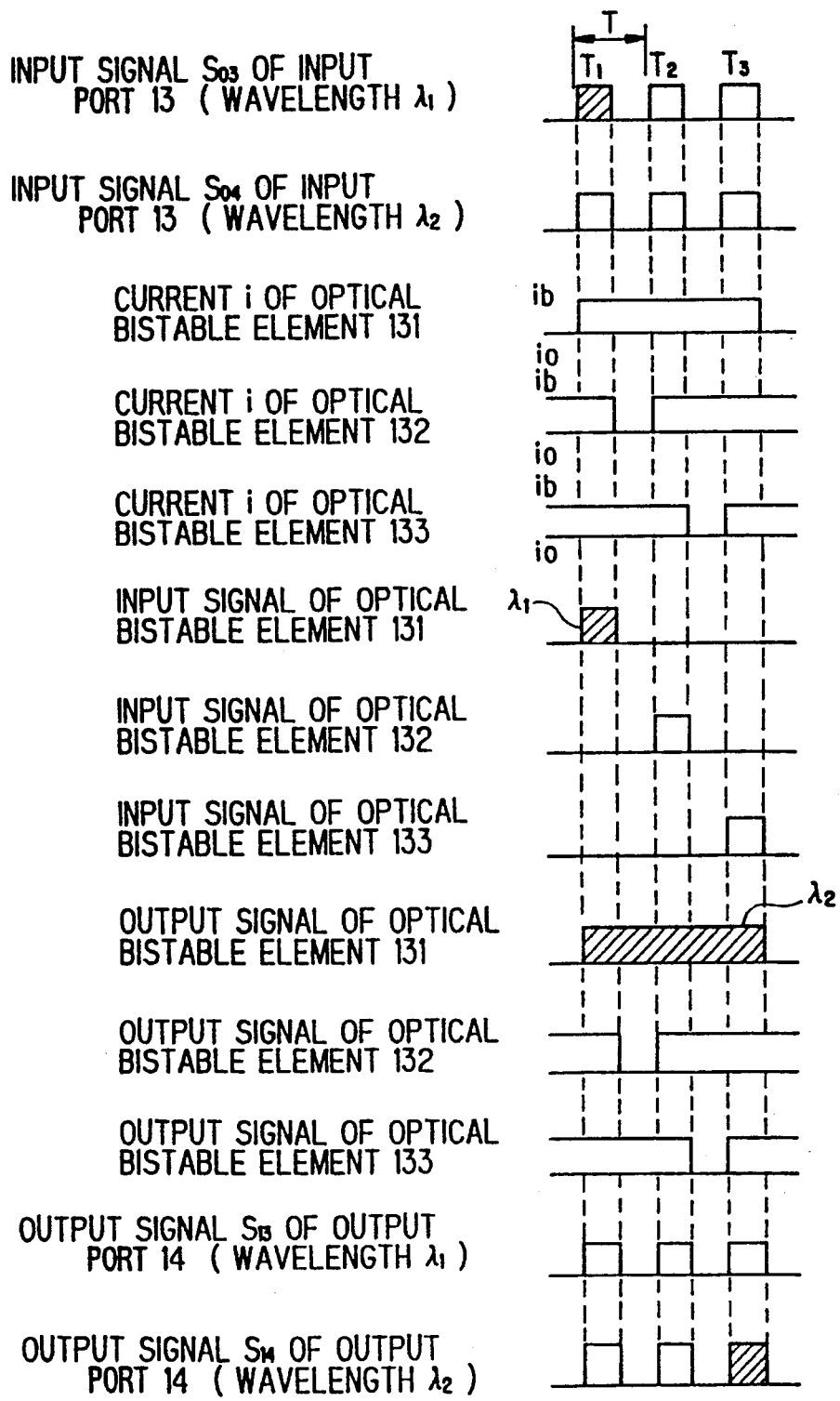
FIG. 7 is a timing chart for explaining operation of the second conventional optical switching system for optical wavelength-division and time-division multiplexed signals.

Next, operation of the second conventional optical switching system will be explained in conjunction with FIG. 7. It is supposed that input signals $S_{01}$ and $S_{02}$ of wavelengths $\lambda_1$ and $\lambda_2$ allocated respectively into time slots $T_1$ to $T_3$ are supplied to an input port 13, and the input signal A of a wavelength $\lambda_1$ in a time slot $T_1$ is to to be exchanged to be supplied to an output port 14 as an output signal $S_{14}$ of a wavelength $\lambda_2$ in a time slot $T_3$. The optical splitter 100 divides the input signal to two signals each to be supplied to the wavelength filters 111 and 112. The wavelength filters 111 and 112 supplies input signals $S_{03}$ of wavelength $\lambda_1$ and $S_{04}$ of wavelength $\lambda_2$ respectively to the optical write switches 121 and 122. The optical write switch 121 supplies the tunable wavelength output optical bistable elements 131 to 133 with input signals respectively allocated in the time slots $T_1$ to $T_3$, respectively. On the other hand, the optical bistable elements 131 to 133 are supplied with the currents i each decreases periodically as shown in FIG. 7, so that the optical bistable elements 131 to 133 become at a reset state periodically in different timings. If the input signals in the time slots $T_1$ to $T_3$ are supplied to the optical bistable element 131 to 133, the optical bistable elements 131 to 133 keep supplying output signals of wavelengths $\lambda_1$ corresponding to the input signals to the optical switch 141 for the period until the current i decreases. The optical switch 141 supplies the output signal of wavelength $\lambda_1$ in the time slot $T_3$ to the optical combiner 150, so that an output signal $S_{14}$ including a signal of wavelength $\lambda_2$ in the time slot $T_3$ is supplied from the output port 14.

Figure 8:
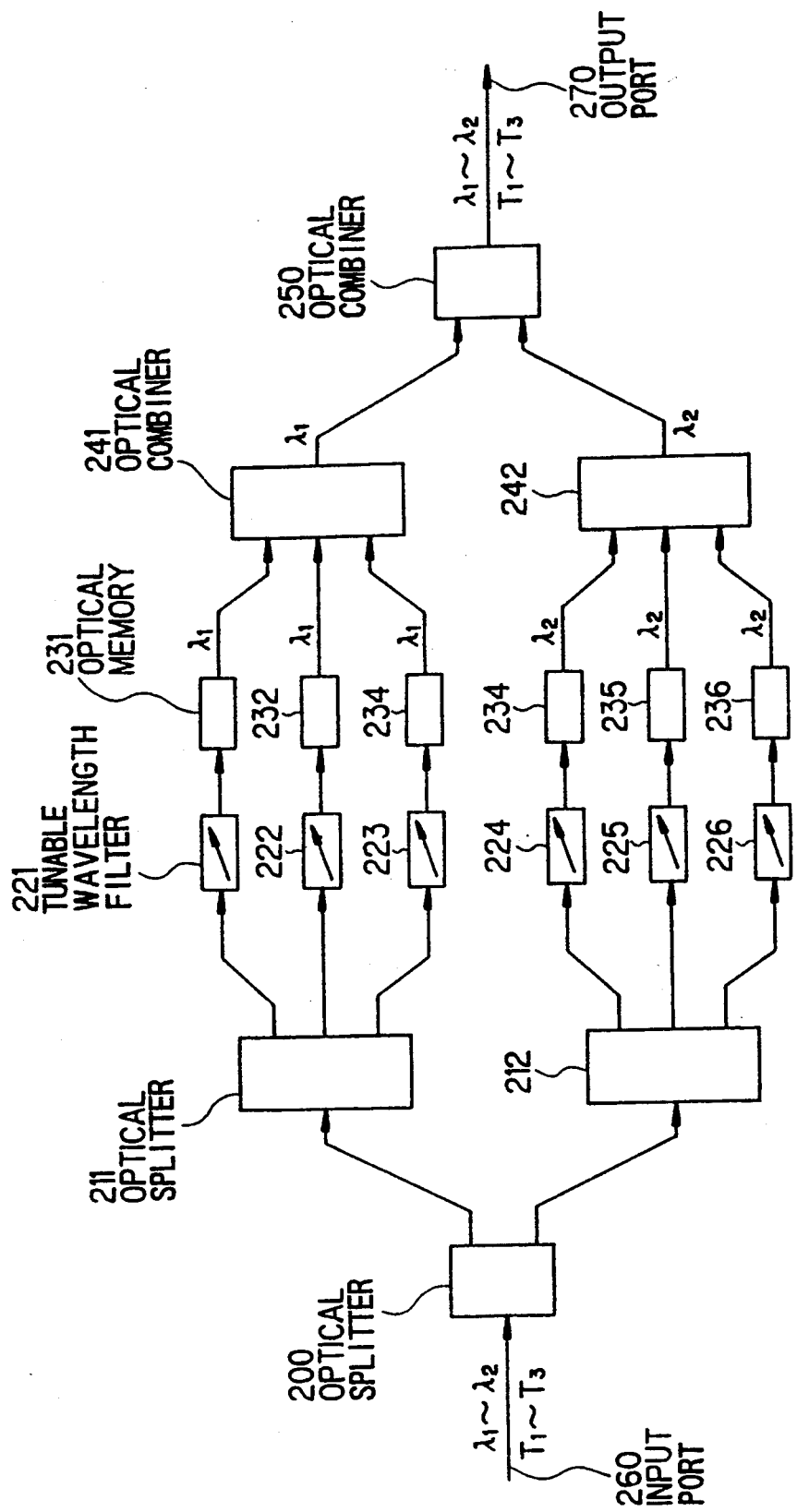
FIG. 8 is a block diagram of an optical switching system for optical wavelength-division and time-division multiplexed signals in a first preferred embodiment according to the invention.

Next, an optical switching system for optical wavelength-division and time-division multiplexed signals in a first preferred embodiment will be explained. As shown in FIG. 8, the optical switching system includes an optical splitter 200 which divides an input optical signal to two optical signals, two optical splitters 211 and 212 each divide a divided optical signal supplied from the optical splitter 200 to three optical signals, six tunable wavelength filters 221 to 226 each selects one optical signal having a specific wavelength and a time slot, six optical memories 231 to 236 each memories a signal supplied from the corresponding tunable wavelength filter, two optical combiners 241 and 242 each combines signals supplied from the optical memories 231 to 236, and an optical combiner 250 which combines the signals supplied from the optical combiners 241 and 242.

Figure 9:
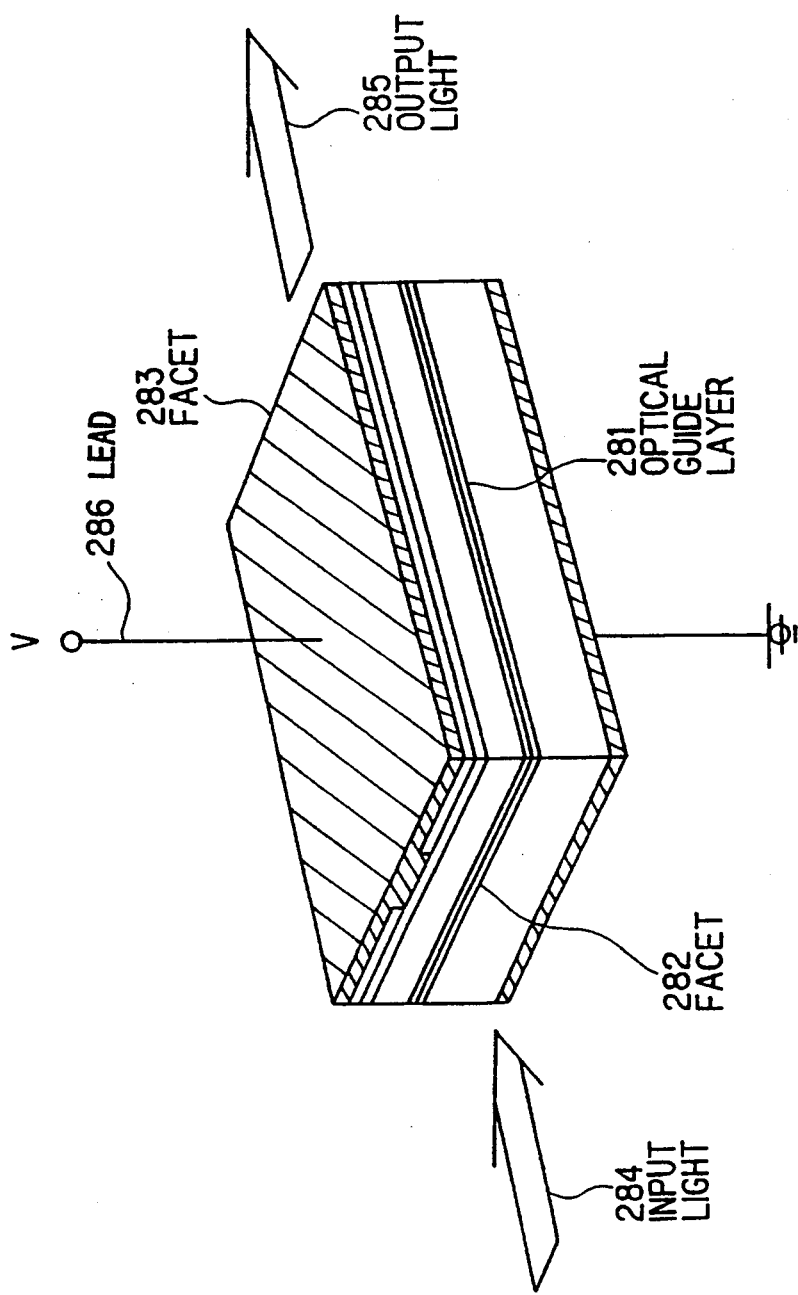
FIG. 9 is a perspective view illustrating an optical memory included in the optical switching system for optical wavelength-division and time-division multiplexed signals shown in FIG. 8.

FIG. 9 shows a structure of the optical memories 231 to 236. The optical memory includes an optical guide layer 281 having facets 282 and 283. An input light 284 is supplied through the facet 282 of the optical guide layer 281 and irradiated from both the facet 282 and the opposite facet 283 as output lights 284 and 285, respectively. The optical memory is applied with a control voltage V which controls the output characteristic thereof.

Figure 10A:
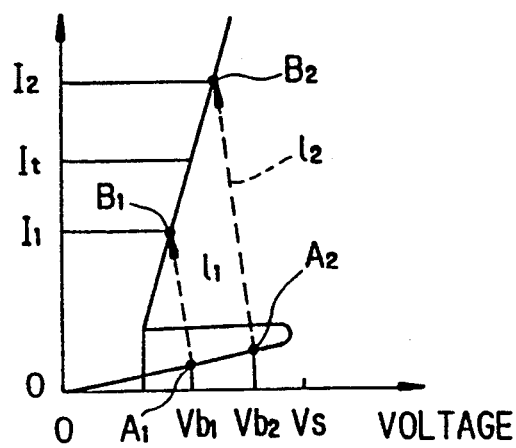
FIGS. 10A and 10B are graphs explaining operation of the optical memory shown in FIG. 9.

FIG. 10A shows a current I which flows through the optical memory correlated with the control voltage V on condition that an input light $P_{in}$ is zero. The optical memory shows a thyristor characteristic in which the current I increases abruptly at the control voltage $V = V_s$ as the control voltage V increases from zero. After passing over $V_s$, as shown in FIG. 10A, there exist two pairs of stable points, that are a pair of $A_1$ and $B_1$ on a load line $l_1$ operated on one operation condition and another pair of $A_2$ and $B_2$ on a load line $l_2$ operated on another operation condition. The operation state of the optical memory transits from the stable point $A_1$ to the stable point $B_1$ at the control voltage $V = V_{b1}$ and from the stable point $A_2$ to the stable point $B_2$.

Figure 10B:
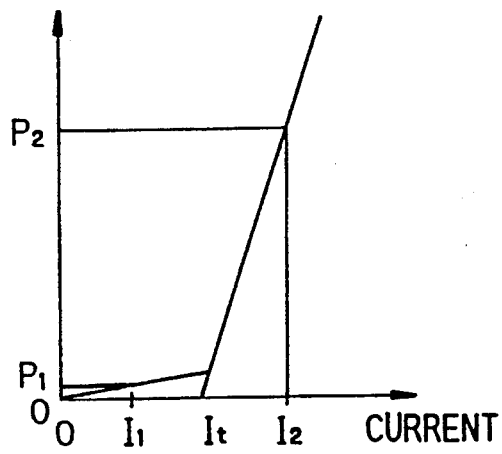

FIG. 10B shows an output intensity $P_{out}$ of the optical memory correlated with the current I. The output intensity $P_{out}$ increases gradually as the current I increases from zero to $I_t$, however, the output intensity $P_{out}$ increases abruptly when the current I becomes over $I_t$. In other words, the optical memory has a threshold characteristic.

However, if the input light intensity $P_{in}$ is not zero, the operation state of the optical memory transits from the stable point $A_2$ to the stable point $B_2$ when the control voltage V becomes $V_2$ which is lower than $V_s$ even if the control voltage V does not reach $V_s$, and the current $I_2$ flows through the optical memory, so that the optical memory irradiates the output light of $P_2$. After that, the current I becomes zero when the control voltage V becomes zero, however, the current I becomes $I_2$ when the control voltage V becomes $V_2$ even if the input light intensity $P_{in}$ is zero. The reason is that carriers exist in the optical memory. These carries are generated when the control voltage $V_2$ is applied to the optical memory while the input light $P_{in}$ is supplied thereto.

Therefore, the optical memory can supply the output light $P_{out}$ corresponding to the input light $P_{in}$ at any time by applying the control voltage $V_2$ thereto after experiencing the condition that the input light $P_{in}$ is not zero when the control voltage $V_s$ is applied thereto. On the other hand, the carries in the optical memory can be removed therefrom by applying the control voltage V having a negative value thereto, so that the optical memory becomes at an initial state in which the transition from the stable point $A_2$ to $B_2$ does not occur unless it is applied with the control voltage V higher than $V_s$.

In the optical memory, the output light may affect the transition of the stable points $A_2$ to $B_2$ in case of memorizing the input light data. In order to avoid such an effect, the control voltage V in the memorizing operation may be preferably $V_1$ by which the transition from the stable point $A_1$ to the stable point $B_1$ in which the current $I_1$ smaller than $I_t$ flows in the optical memory occurs, so that the output light intensity $P_{out}$ becomes $P_1$ which is quite small, as shown in FIG. 10B.

As explained above, the optical memory can memorize the output intensity $P_{out}$, so that the optical memory can supply the output light $P_{out}$ corresponding to the input light $P_{in}$ at any time by applying the control voltage $V_2$ thereto after experiencing the condition that the input light $P_{in}$ is not zero when the control voltage $V_s$ is applied thereto.

The wavelength of the output light $P_{out}$ the optical memory can be changed by adjusting either the control voltage $V_{b2}$ at the reading operation or the current I by adjusting a value of a resistance connected to the lead 286 through which the current I flows. The wavelength of the output light $P_{out}$ can be also changed by controlling the temperature of the optical memory.

Such an optical memory has been disclosed by K. Kasahara et al. in Appl. Phys. Lett., vol. 52(a), 29 of Feb. 1988, entitled "Double heterostructure opto electronic switch as a dynamic memory with low-power consumption" and by I. Ogura et al. on pages 533 to 536 of the text of the 22nd Conference on solid state devices and materials, Sendai, 1990, entitled "A novel optical self-routing switch with a wavelength filtering function using a vertical to surface transmission electro-photonic device".

Figure 11:
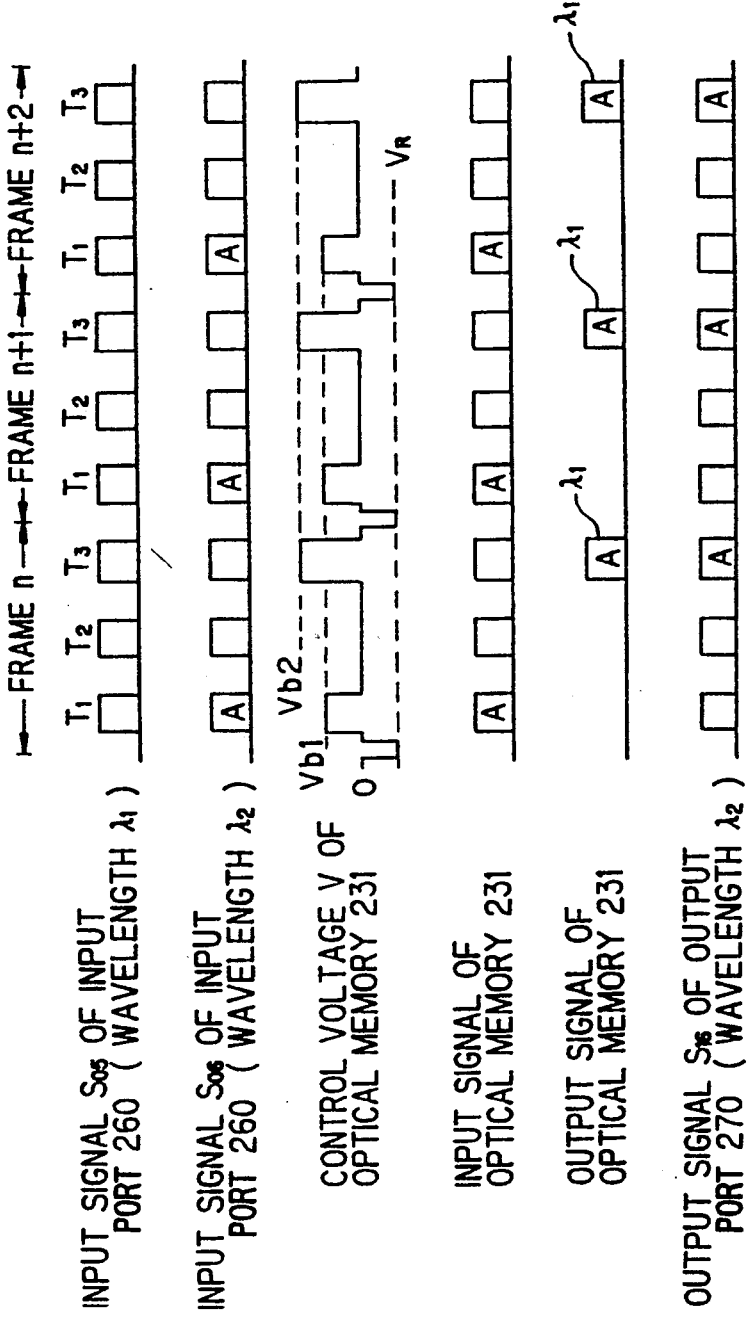
FIG. 11 is a timing chart for explaining operation of the optical switching system for optical wavelength-division and time-division multiplexed signals in the first preferred embodiment according to the invention.

Next, operation of the optical switching system will be explained in conjunction with FIG. 11. It is supposed that input signals $S_{05}$ and $S_{06}$ of wavelengths $\lambda_1$ and $\lambda_2$ allocated respectively into time slots $T_1$ to $T_3$ are supplied to an input port 260, and the input signal A of a wavelength $\lambda_2$ in a time slot $T_1$ is to to be exchanged to be supplied to an output port 270 as an output signal $S_{16}$ of a wavelength $\lambda_1$ in a time slot $T_3$. The tunable wavelength filter 221 is supplied with the input signals $S_{05}$ of wavelength $\lambda_1$ and $S_{06}$ of wavelength $\lambda_2$. On the other hand, the optical memory 231 is applied with the control voltage V which becomes a negative voltage $V_R$ periodically as shown in FIG. 11, so that the optical memory 231 becomes at a reset state periodically to clear the memorized data. If the input signal A of wavelength $\lambda_2$ in a time slot $T_1$ is supplied to the optical memory 231, the optical memory 231 memorizes the data corresponding to the input signal A at the time slot $T_1$ in which the control voltage V rises to $V_{b1}$. Then, the optical memory 231 supplies the an output signal of wavelength $\lambda_1$ corresponding to the input signal A at the time slot $T_3$ in which the control voltage V rises to $V_{b2}$. The optical combiner 241 combines output signals including the output signal supplied from the optical memory 231, and then the optical combiner 250 combines output signals from the optical combiners 241 and 242, so that an output signal $S_{16}$ including a signal of wavelength $\lambda_1$ in the time slot $T_3$ is supplied from the output port 270.

In the optical switching system, the optical memory can supply the output light $P_{out}$ corresponding to the input light $P_{in}$ at any time by applying the control voltage $V_2$ thereto, so that it is not necessary to be provided with optical switches in the system. Therefore, the number of active elements decreases to $2 \times m \times n$ in case of the wavelength-division of m and time-division multiplexity numbers of n.

Figure 12:
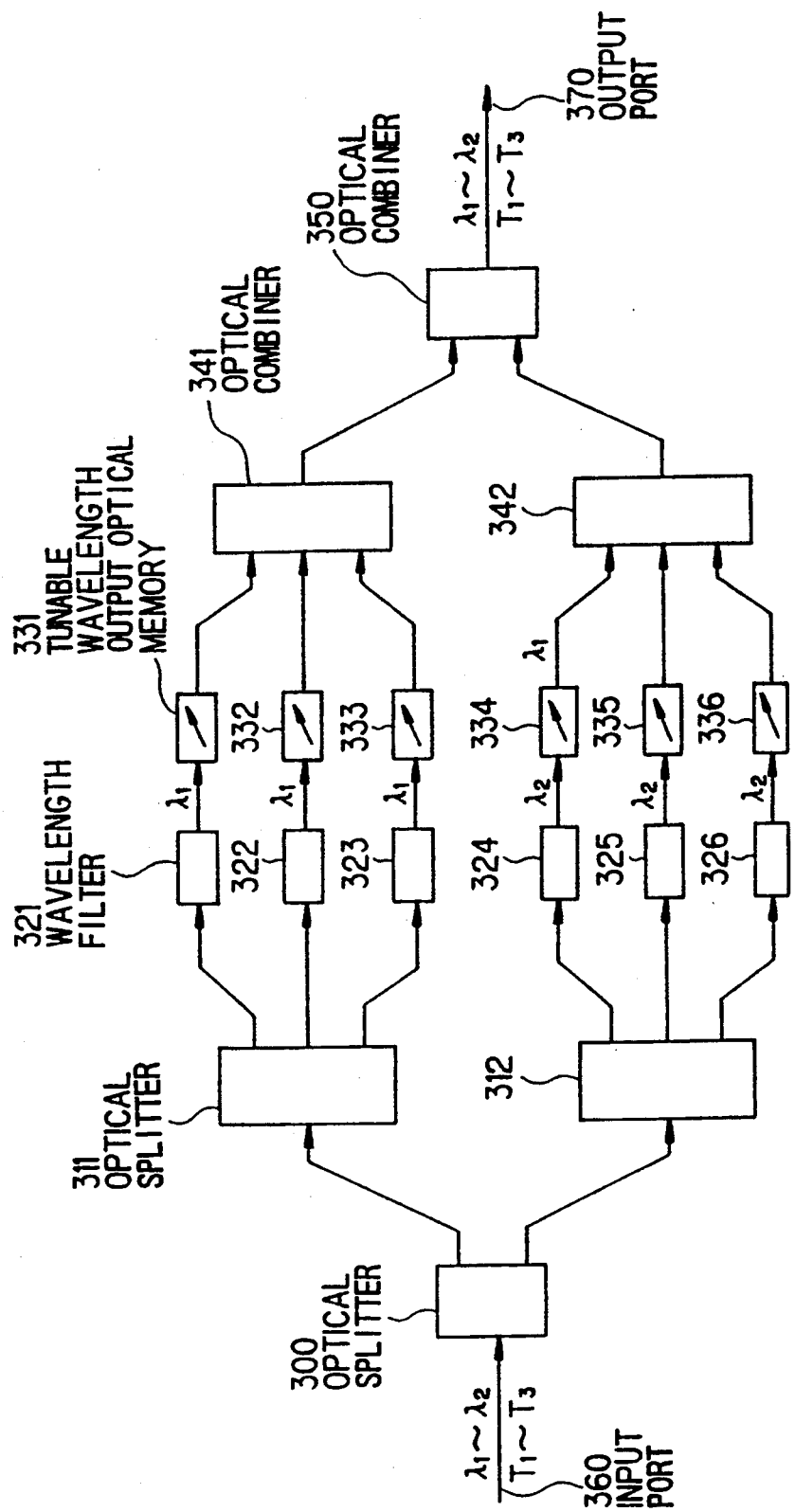
FIG. 12 is a block diagram of an optical switching system for optical wavelength-division and time-division multiplexed signals in a second preferred embodiment according to the invention.

Next, an optical switching system for optical wavelength-division and time-division multiplexed signals in a second preferred embodiment will be explained. As shown in FIG. 12, the optical switching system includes an optical splitter 300 which divides an input optical signal to two optical signals, two optical splitters 311 and 312 each divides a divided optical signal supplied from the optical splitter 300 to three optical signals, six wavelength filters 321 to 326 each selecting one optical signal having a specific wavelength and a time slot, six tunable wavelength optical memories 331 to 336 each memorizing a signal supplied from the corresponding wavelength filter, two optical combiners 341 and 342 each combines signals supplied from the tunable wavelength optical memories 331 to 336, and an optical combiner 350 which combines the signals supplied from the optical combiners 341 and 342. The structure of the tunable wavelength optical memories 331 to 336 is the same as shown in FIG. 9, and the operation thereof is also the same, except that each of the tunable wavelength optical memories can convert the wavelength of the input signal to desired wavelengths selected from $\lambda_1$ and $\lambda_2$.

Figure 13:
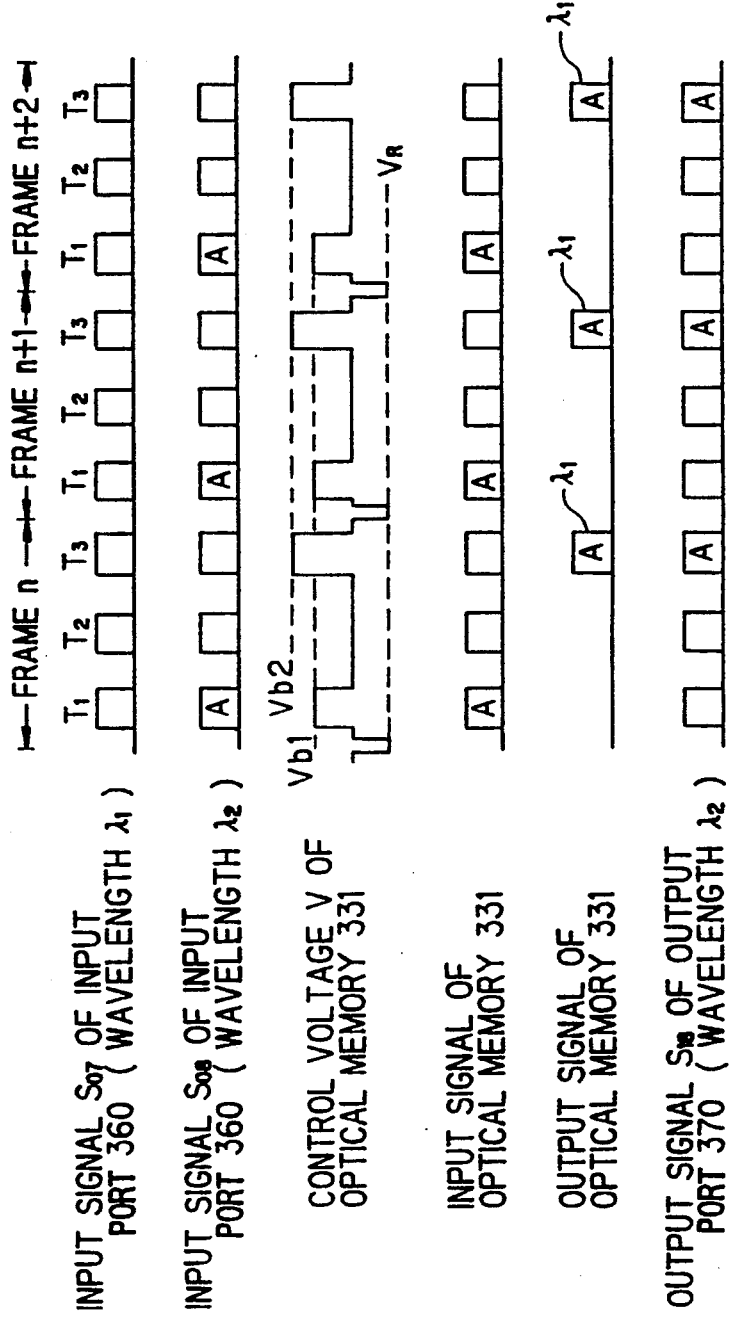
FIG. 13 is a timing chart for explaining operation of the optical switching system for optical wavelength-division and time-division multiplexed signals in the second preferred embodiment according to the invention.

Next, operation of the optical switching system will be explained in conjunction with FIG. 13. It is supposed that input signals $S_{07}$ and $S_{08}$ of wavelengths $\lambda_1$ and $\lambda_2$ allocated respectively into time slots $T_1$ to $T_3$ are supplied to an input port 360, and the input signal A of a wavelength $\lambda_2$ in a time slot $T_1$ is to to be exchanged to be supplied to an output port 370 as an output signal $S_{18}$ of a wavelength $\lambda_1$ in a time slot $T_3$. The tunable wavelength filter 321 is supplied with the input signals $S_{07}$ of wavelength and $S_{08}$ of wavelength $\lambda_2$. On the other hand, the optical memory 331 is applied with the control voltage V which becomes a negative voltage $V_R$ periodically as shown in FIG. 13, so that the optical memory 331 becomes at a reset state periodically to clear the memorized data. If the input signal A of wavelength $\lambda_2$ in a time slot $T_1$ is supplied to the optical memory 331, the optical memory 331 memorizes the data corresponding to the input signal A at the time slot $T_1$ in which the control voltage V rises to $V_{b1}$. Then, the optical memory 331 supplies the an output signal of wavelength $\lambda_1$ corresponding to the input signal A at the time slot $T_3$ in which the control voltage V rises to $V_{b2}$. The optical combiner 341 combines output signals including the output signal supplied from the optical memory 331, and then the optical combiner 350 combines output signals from the optical combiners 341 and 342, so that an output signal $S_{18}$ is including a signal of wavelength $\lambda_1$ in the time slot $T_3$ is supplied from the output port 370.

Figure 14:
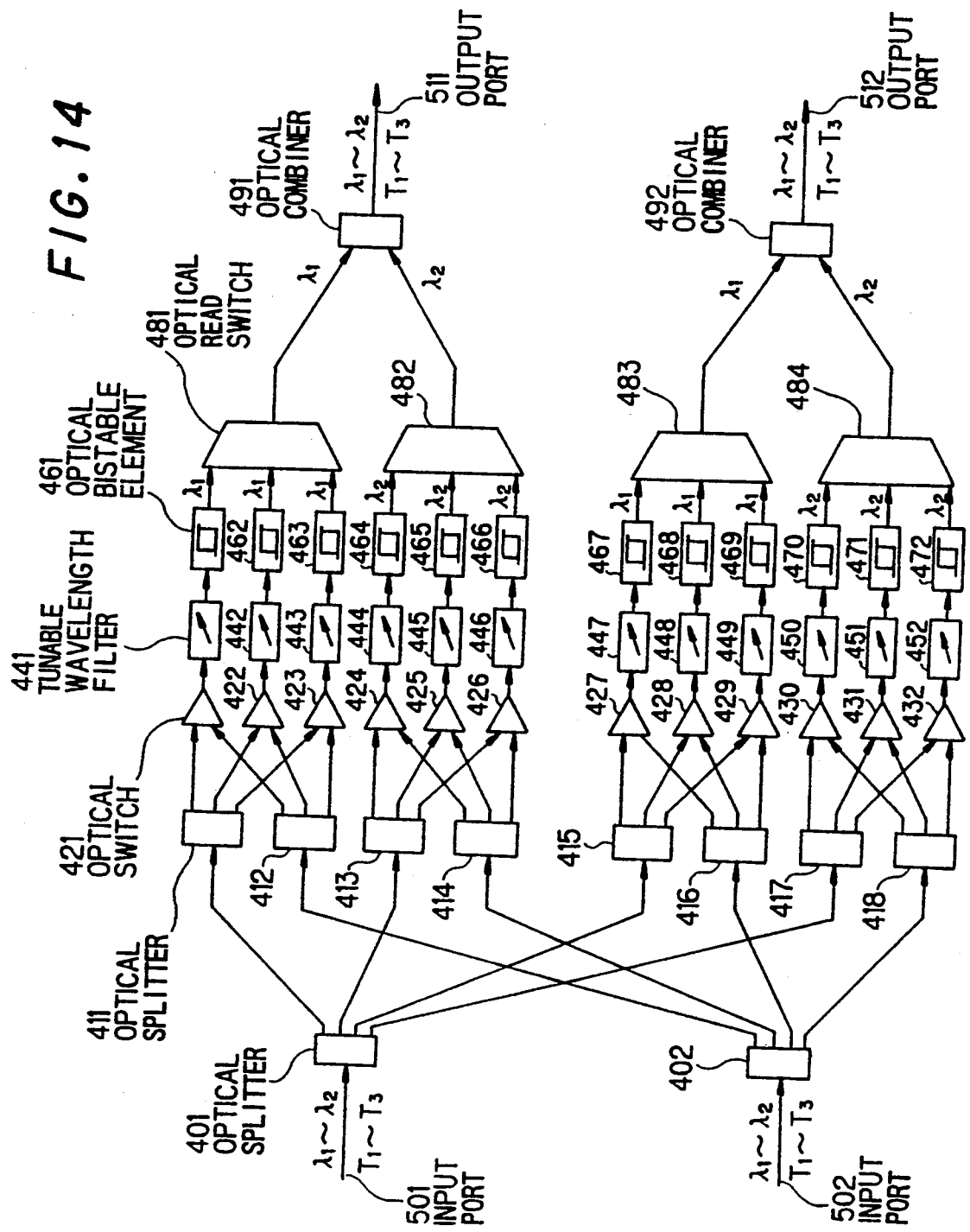
FIG. 14 is a block diagram of an optical switching system for optical wavelength-division and time-division multiplexed signals in a third preferred embodiment according to the invention.

Next, an optical switching system for optical wavelength-division and time-division multiplexed signals in a third preferred embodiment will be explained. In this preferred embodiment, the optical switching system has two input ports and two output ports. As shown in FIG. 14, the optical switching system includes two optical splitters 401 and 402 each dividing an input optical signal to two optical signals, eight optical splitters 411 and 318 each dividing a divided optical signal supplied from the optical splitters 401 or 402 to three optical signals, twelve optical switches 421 to 432 each selectively supplying an output optical signal from two input signals from the corresponding two optical splitters of the twelve optical splitters, twelve tunable wavelength filters 441 to 452 each selecting one optical signal having a specific wavelength and a time slot, twelve optical bistable elements 461 to 472 each keeps supplying a signal supplied from the corresponding tunable wavelength filter, four optical read switches 481 to 484 each selectively supplying an output signal selected from the signals supplied from the corresponding three optical bistable elements of the twelve optical bistable elements 461 to 472, and two optical combiners 491 and 492 each combining the signals supplied from the two corresponding optical read switches of the four optical read switches 481 to 484.

Next, operation of the optical switching system will be explained in conjunction with FIG. 15. It is supposed that input signals $S_{21}$ and $S_{22}$ of wavelengths $\lambda_1$ and $\lambda_2$ allocated respectively into time slots $T_1$ to $T_3$ are supplied to input ports 401 and 402, and the input signal A of a wavelength $\lambda_1$ in a time slot $T_1$ is to to be exchanged to be supplied to an output port 491 as an output signal $S_{51}$ of a wavelength $\lambda_2$ in a time slot $T_2$ and the input signal B of a wavelength $\lambda_1$ in a time slot $T_3$ is to be exchanged to be supplied to output port 492 as an an output signal $S_{41}$ of a wavelength $\lambda_1$ in a time slot $T_3$. The optical switch 421 is supplied with the input signal $S_{31}$ of wavelength $\lambda_1$ from the input port 501 through the optical splitters 401 and 411 and $S_{32}$ of wavelength $\lambda_2$ from the input port 502 through the optical splitters 402 and 412, and the optical switch 421 supplies output signals supplied from the input port 502 in a time slot $T_2$. The tunable wavelength filter 441 selectively supplies the optical bistable element 461 with the output signal $S_{32}$ of a wavelength $\lambda_2$. On the other hand, the optical switch 430 is supplied with the input signal $S_{21}$ of wavelength $\lambda_1$ from the input port 501 through the optical splitters 401 and 417 and $S_{24}$ of wavelength $\lambda_2$ from the input port 502 through the optical splitters 402 and 418, and the optical switch 430 supplies output signals supplied from the input port 502 in a time slot $T_1$. The tunable wavelength filter 450 selectively supplies the optical bistable element 470 with the output signal $S_{21}$ of a wavelength $\lambda_1$.

Figure 15:
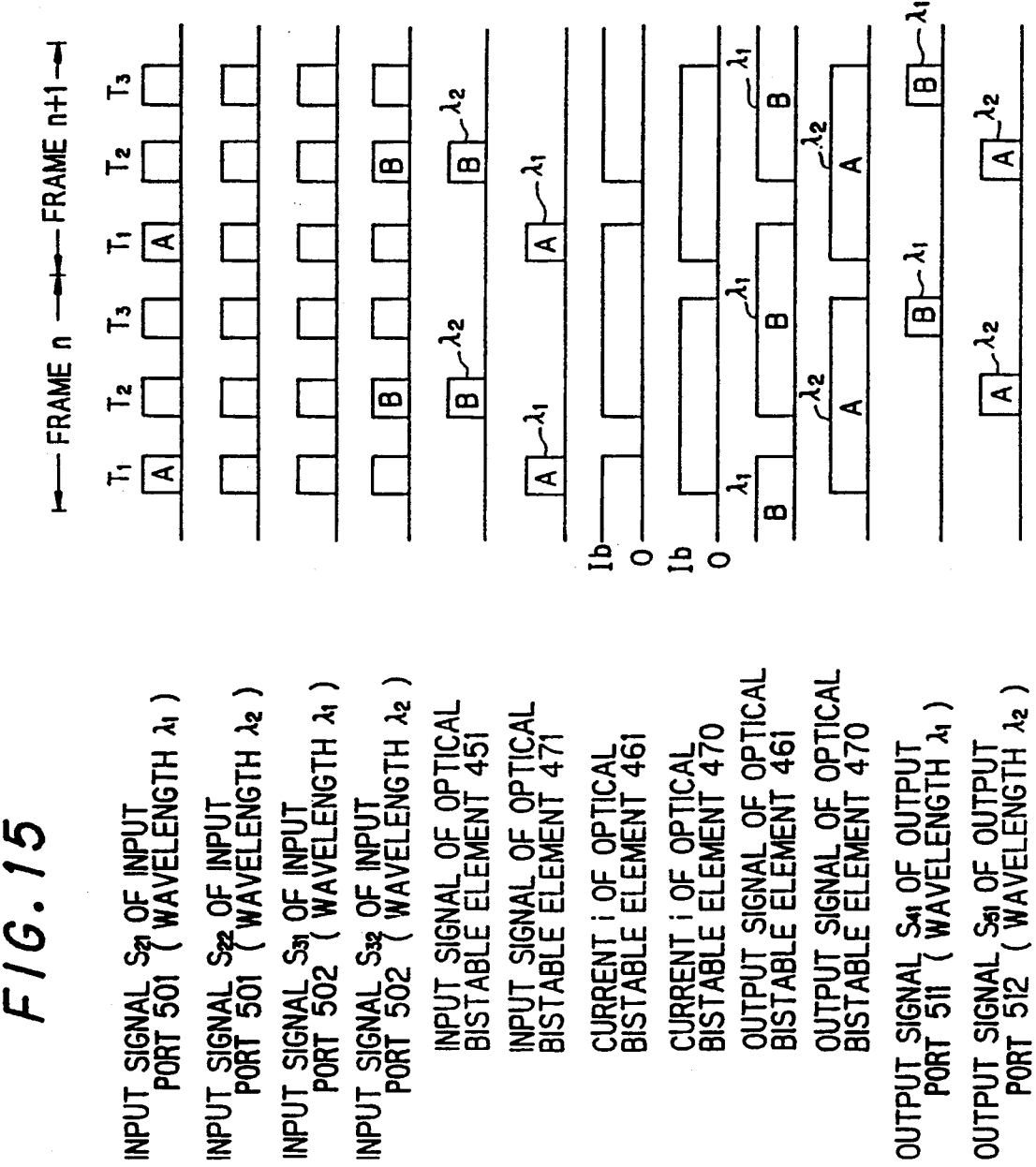
FIG. 15 is a timing chart for explaining operation of the optical switching system for optical wavelength-division and time-division multiplexed signals in the third preferred embodiment according to the invention.

On the other hand, the optical bistable elements 461 and 470 are respectively supplied with the currents i each decreases periodically as shown in FIG. 15, so that the optical bistable elements 461 and 470 become at a reset state periodically in different timings. Therefore, the optical bistable elements 461 and 470 respectively keep supplying the output signal B of wavelengths $\lambda_1$ and the output signal A of wavelength $\lambda_2$ to the optical read switches 481 and 484 for the period until the current i decreases. The optical read switch 481 supplies the output signal of wavelength $\lambda_1$ in the time slot $T_3$ to the optical combiner 491 and the optical read switch 484 supplies the output signal of wavelength $\lambda_2$ in the time slot $T_2$ to the optical combiner 492. Consequently, an output signal $S_{41}$ including a signal of wavelength $\lambda_1$ in the time slot $T_3$ is supplied from the output port 511, while an output signal $S_{51}$ including a signal of wavelength $\lambda_2$ in the time slot $T_2$ is supplied from the output port 512.

Although the invention has been described with respect to specific embodiment for complete and clear disclosure, the appended claims are not to thus limited and alternative constructions that may occur to one skilled in the art which fairly fall within the basic teaching herein set forth.

What is claimed is:

1. An optical switching system for optical wavelength-division and time-division multiplexed signals, comprising:

a plurality (n) of tunable wavelength filters each of which selects a signal having a desired wavelength from an optical wavelength-division and time-division multiplexed signal in every time-slot; and a plurality (n) of optical memory elements each of which is connected to a control electrode and supplied with an output signal of a corresponding one of said plurality (n) of tunable wavelength filters, each of said plurality (n) of optical memory elements capable of memorizing a light intensity and "high" or "low" state of said output signal by being applied with a first control voltage received from the control electrode and having a predetermined time width, and supplying an output port with said output signal which is converted to have a predetermined wavelength in a desired time slot, and each of said plurality (n) of optical memory elements further capable of reading out the memorized "high" or "low" state by being applied with a second control voltage having a time width approximately equal to the predetermined time width, the second control voltage being higher than the first control voltage, and the reading-out of the "high" or "low" state being in the form of the presence or non-presence of an output light having a time width supplied from the optical memory element.

2. An optical switching system for optical wavelength-division and time-division multiplexed signals, comprising:

a plurality (n) of wavelength filters each of which selects a signal having a predetermined wavelength from an optical wavelength-division and time-division multiplexed signal; and a plurality (n) of tunable wavelength optical memory elements each of which is connected to a control electrode and supplied with an output signal of a corresponding one of said plurality (n) of wavelength filters, each of said plurality (n) of tunable wavelength optical memory elements capable of memorizing a light intensity and "high" or "low" state of said output signal by being applied with a first control voltage received from the control electrode and having a predetermined time width, and supplying an output port with said output signal which is converted to have a desired wavelength in a desired time slot, and each of said plurality (n) of tunable wavelength optical memory elements further capable of reading out the memorized "high" or "low" state by being applied with a second control voltage having a time width approximately equal to the predetermined time width, the second control voltage being higher than the first control voltage, and the reading-out of the "high" or "low" state being in the form of the presence or non-presence of an output light having a time width supplied from the optical memory element.

3. An optical switching system for optical wavelength-division and time-division multiplexed signals, comprising:

a plurality ($k \times l \times m$) of optical switches each of which selectively supplies an output signal at a desired time slot from an optical wavelength-division and time-division multiplexed signal;

a plurality ($k \times l \times m$) of tunable wavelength filters each of which selects a signal having a desired wavelength from said optical wavelength-division and time-division multiplexed signal in every time-slot; and a plurality ($k \times l \times m$) of optical memory elements each of which is connected to a control electrode and keeps supplying an output signal for a corresponding one of said plurality ($k \times l \times m$) of tunable wavelength filters for a desired period, said output signal being converted to have a predetermined wavelength, each of said plurality ($k \times l \times m$) of optical memory elements capable of memorizing a light intensity and "high" or "low" state of said output signal by being applied with a first control voltage received from the control electrode and having a predetermined time width, and each of said plurality ($k \times l \times m$) of optical memory elements further capable of reading out the memorized "high" or "low" state by being applied with a second control voltage having a time width approximately equal to the predetermined time width, the second control voltage being higher than the first control voltage, and the reading-out of the "high" or "low" state being in the form of the presence or non-presence of an output light having a time width supplied from the optical memory element.

* * * * *